US012355146B2

(12) United States Patent
You et al.

(10) Patent No.: US 12,355,146 B2
(45) Date of Patent: Jul. 8, 2025

(54) TRANSPARENT ANTENNA

(71) Applicant: LG ELECTRONICS INC., Seoul (KR)

(72) Inventors: Dongjoo You, Seoul (KR); Kangjae Jung, Seoul (KR); Byungwoon Jung, Seoul (KR); Junseok Lee, Seoul (KR); Byeongyong Park, Seoul (KR); Seongmoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 18/168,872

(22) Filed: Feb. 14, 2023

(65) Prior Publication Data

US 2023/0261367 A1 Aug. 17, 2023

(30) Foreign Application Priority Data

Feb. 17, 2022 (KR) ........................ 10-2022-0020696
Jun. 20, 2022 (WO) ................ PCT/KR2022/008676

(51) Int. Cl.
*H01Q 1/32* (2006.01)
*H01Q 1/12* (2006.01)

(52) U.S. Cl.
CPC ......... *H01Q 1/3291* (2013.01); *H01Q 1/1271* (2013.01)

(58) Field of Classification Search
CPC ...... H01Q 1/1271; H01Q 1/32; H01Q 1/3216; H01Q 1/325; H01Q 1/3291
See application file for complete search history.

(56) References Cited

U.S. PATENT DOCUMENTS

| | | | | |
|---|---|---|---|---|
| 6,384,790 B2 * | 5/2002 | Dishart | B32B 17/10174 343/713 |
| 11,569,580 B2 * | 1/2023 | Dai | H01Q 1/325 |
| 2005/0195114 A1 * | 9/2005 | Yegin | H01Q 1/325 343/713 |
| 2006/0152421 A1 * | 7/2006 | Baranski | H01Q 13/10 343/704 |
| 2006/0202898 A1 * | 9/2006 | Li | H01Q 1/1271 343/713 |

(Continued)

FOREIGN PATENT DOCUMENTS

| | | |
|---|---|---|
| KR | 10-2002-0022482 | 3/2002 |
| KR | 10-2010-0124954 | 11/2010 |

(Continued)

OTHER PUBLICATIONS

PCT International Application No. PCT/KR2022/008676, Written Opinion of the International Searching Authority dated Mar. 10, 2023, 10 pages.

*Primary Examiner* — Jason M Crawford
(74) *Attorney, Agent, or Firm* — LEE, HONG, DEGERMAN, KANG & WAIMEY

(57) ABSTRACT

Antennas capable of supporting high frequencies are disclosed, for example, a transparent antenna applicable to glass for vehicles is disclosed. A transparent antenna installed on a glass includes an adhesive layer attached to the glass, a transparent substrate disposed on the adhesive layer, an antenna structure layer disposed on the transparent substrate, a protective layer disposed on the antenna structure layer, and a power feeding portion connected to the antenna structure layer.

4 Claims, 12 Drawing Sheets

(56) References Cited

U.S. PATENT DOCUMENTS

| | | | | |
|---|---|---|---|---|
| 2009/0140938 | A1* | 6/2009 | Ishibashi | H01Q 1/44 343/897 |
| 2009/0169877 | A1* | 7/2009 | Dixon | B32B 17/10036 428/339 |
| 2012/0098716 | A1* | 4/2012 | Dai | H01Q 1/1271 343/713 |
| 2017/0033433 | A1* | 2/2017 | Winkelmann | H01Q 13/106 |
| 2018/0037007 | A1* | 2/2018 | Droste | B32B 17/10036 |
| 2018/0233804 | A1* | 8/2018 | Nakano | H01Q 1/1278 |
| 2022/0059948 | A1* | 2/2022 | Sayama | H01Q 9/0407 |
| 2022/0320736 | A1* | 10/2022 | Jung | H01Q 1/48 |
| 2022/0359980 | A1* | 11/2022 | Lin | H01Q 1/38 |
| 2023/0068756 | A1* | 3/2023 | Carper | H01Q 9/0428 |
| 2023/0089629 | A1* | 3/2023 | Ouyang | H01Q 1/243 343/720 |
| 2023/0261367 | A1* | 8/2023 | You | H01Q 1/1271 343/700 R |
| 2023/0299496 | A1* | 9/2023 | Kim | H01Q 1/422 |
| 2024/0014538 | A1* | 1/2024 | Park | H01Q 1/38 |
| 2024/0047863 | A1* | 2/2024 | Zhou | H01Q 1/1271 |
| 2024/0162601 | A1* | 5/2024 | You | H01Q 1/1271 |
| 2024/0396202 | A1* | 11/2024 | Aliakbariabar | H01Q 15/0086 |

FOREIGN PATENT DOCUMENTS

| | | |
|---|---|---|
| KR | 10-2010-0137689 | 12/2010 |
| KR | 10-2016-0054848 | 5/2016 |
| KR | 10-2020-0114886 | 10/2020 |

* cited by examiner

*** Variables for physical properties: Type of R group, Molecular weight

TRANSPARENT ANTENNA

CROSS-REFERENCE TO RELATED APPLICATIONS

Pursuant to 35 U.S.C. § 119, this application claims the benefit of an earlier filing date and right of priority to Korean Application No. 10-2022-0020696, filed on Feb. 17, 2022 and International Application No. PCT/KR2022/008676, filed on Jun. 20, 2022, the contents of which are all incorporated by reference herein in their entirety.

BACKGROUND OF THE DISCLOSURE

Field of the Disclosure

The embodiments of the present disclosure are applicable to antennas capable of supporting high frequencies, and more particularly to, for example, a transparent antenna applicable to glass for vehicles.

Discussion of the Related Art

As 5G communication has rapidly come into widespread use, the improvement process for automotive antennas (hereinafter referred to as vehicle antennas) is underway to expand from the existing FM/AM and LTE (4G) communication antennas to 5G Sub6 and V2X communication that supports high frequencies. Accordingly, vehicle antennas are being developed in various ways, such as a shark-fin antenna, a dashboard-embedded type, a spoiler-embedded type, and a side-mirror type, in consideration of performance, design, and network scalability.

The shark fin antennas, which are most widely applied as vehicle antennas, have high transmission/reception (Tx/Rx) performance by being installed on the roof of vehicles, but have limitations in network scalability due to space restrictions.

In contrast, the dashboard-embedded antenna is installed inside the vehicle and has poor antenna performance, but has an advantage of increasing network scalability due to relatively small spatial restrictions.

In order to supplement these existing antennas, the spoiler-embedded antenna and the sidemirror-embedded antenna have recently been developed and applied to vehicles to further increase the antenna performance and the network scalability, but such embedded-type antennas have difficulty in actual implementation in vehicles due to their design constraints.

Therefore, evolved antennas for vehicles, which can satisfy these various requirements, need to be developed.

SUMMARY OF THE DISCLOSURE

Accordingly, embodiments of the present disclosure are directed to a transparent antenna that substantially obviates one or more problems due to limitations and disadvantages of the related art. An object of the present disclosure is to provide a transparent antenna for vehicles applicable to 5G communication and V2X communication.

Another object of the present disclosure is to provide a transparent antenna capable of implementing low signal loss, high heat resistance, and yellowing prevention that are suitable for automotive environments.

Still another object of the present disclosure is to provide a transparent antenna that can be freely installed in any vehicle design without damaging the original design of vehicles.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a transparent antenna may include: an adhesive layer attached to a glass; a transparent substrate disposed on the adhesive layer; an antenna structure layer disposed on the transparent substrate; a protective layer disposed on the antenna structure layer; and a power feeding portion connected to the antenna structure layer.

The transparent antenna may further include a connection cable connected to the power feeding portion.

A first surface of the power feeding portion may be connected to the antenna structure layer, and a second surface of the power feeding portion may be connected to the connection cable.

The power feeding portion may include a substrate, a first metal layer disposed on a first surface of the substrate, and a second metal layer disposed on a second surface of the substrate.

The power feeding portion may be disposed on a black mask layer located on the glass.

The antenna structure layer may be formed in a metal mesh shape.

The antenna structure layer may include a metal mesh structure, and a resin layer formed to fill the metal mesh structure.

The metal mesh structure may be configured in a manner that metal lines having a first line width are spaced apart from each other by a first spacing to form the mesh structure.

The transparent antenna may further include an ultraviolet (UV) blocking film disposed between the adhesive layer and the transparent substrate.

The adhesive layer may include a silicone-based or acrylic material.

The adhesive layer may include an ultraviolet (UV) blocking agent.

The UV blocking agent may include at least one of a benzotriazole-based polymer, a triazole-based polymer, or an inorganic material including $SiO_2$ (or $TiO_2$).

The transparent substrate may include PET or Cyclo Olefin Polymer (COP).

In accordance with another aspect of the present disclosure, a transparent antenna may include: an adhesive layer attached to a glass of a vehicle; a transparent substrate disposed on the adhesive layer; an antenna structure layer disposed on the transparent substrate and having a metal mesh structure; a protective layer disposed on the antenna structure layer; and a power feeding portion connected to the antenna structure layer.

The transparent antenna may further include a cover layer disposed on both sides of the power feeding portion.

At least one of the cover layer and the transparent substrate may include PET or cyclo olefin imide polymer (COP).

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions.

In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining at least two or more drawings are also within the scope of the present disclosure.

In addition, when an element such as a layer, region or module is described as being "on" another element, it is to be understood that the element may be directly on the other element or there may be an intermediate element between them.

Figure 1:
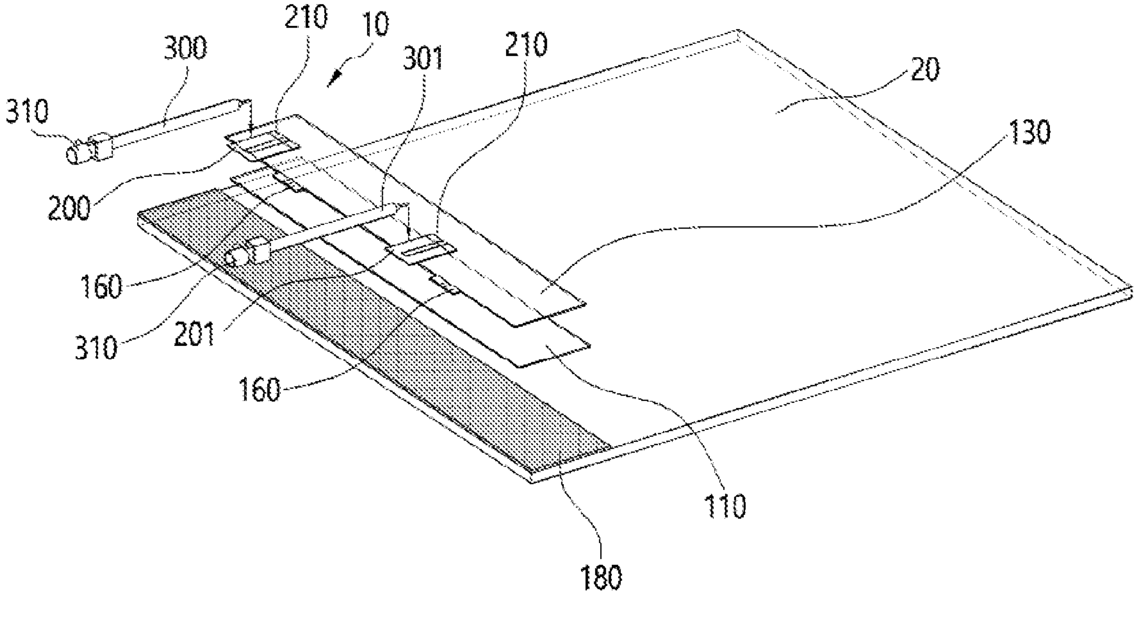
FIG. 1 is an exploded perspective view illustrating a transparent antenna according to an embodiment of the present disclosure.

FIG. 1 is an exploded perspective view illustrating a transparent antenna 10 according to an embodiment of the present disclosure.

Referring to FIG. 1, a transparent antenna 10 according to an embodiment of the present disclosure may be attached to and installed on a glass 20. For example, the transparent antenna 10 may be attached to and installed on a glass of a vehicle. The glass of such a vehicle may include a front glass (windshield), a rear glass, a sunroof glass, and the like. That is, the transparent antenna 10 according to an embodiment of the present disclosure may be installed on a transparent glass installed in a vehicle.

The transparent antenna 10 may broadly include an antenna portion 100 including an antenna structure layer 130 and power feeding portions 200 and 201 connected to the antenna structure layer 130. The power feeding portions 200 and 201 may be connected to a device (e.g., a communication module) requiring a transparent antenna 10 through cables 300 and 301, respectively. In more detail, the power feeding portion 200 may be connected to the device through the cable 300, and the power feeding portion 201 may be connected to the device through the cable 301.

In this case, the power feeding portions 200 and 201 may be provided at two locations and connected to two portions of the antenna structure layer 130, respectively. That is, each of the two feeding portions 200 and 201 may include a bonding portion 210, and the two bonding portions 210 may be respectively connected to two connection portions 160 electrically connected to the antenna structure layer 130.

The antenna structure layer 130 may include a conductive network structure such as a transparent electrode line or a metal mesh. This conductive network structure may be electrically connected to the connection portion 160. The connection portion 160 is connected to the bonding portion 210 so that the conductive network structure of the antenna structure layer 130 may be electrically connected to the power feeding portions 200 and 201.

According to an embodiment of the present disclosure, the antenna structure layer 130 may have a metal mesh structure as a conductive network structure. This will be described later in detail.

The cables 300 and 301 may be implemented as Fakra cables. The cables 300 and 301 may be electrically connected to the power feeding portions 200 and 201 by soldering, respectively.

A black mask layer 180 may be provided on the surface of the glass 20. The edges of the glass 20 of the vehicle can usually be treated with a black mask. That is, the black mask layer 180 may be located at the edges of the vehicle glass. A connector 310 of the Fakra cables 300 and 301 may be located at a portion where the black mask layer 180 is located. Also, the transparent antenna 10 may be located inside the black mask layer 180 (upper side in FIG. 1).

The power feeding portions 200 and 201 for connecting the transparent antenna 10 to the connector 310 of the Fakra cables 300 and 301 may be installed on the black mask layer 180 or on the surface of the glass 20 as needed.

Figure 2:
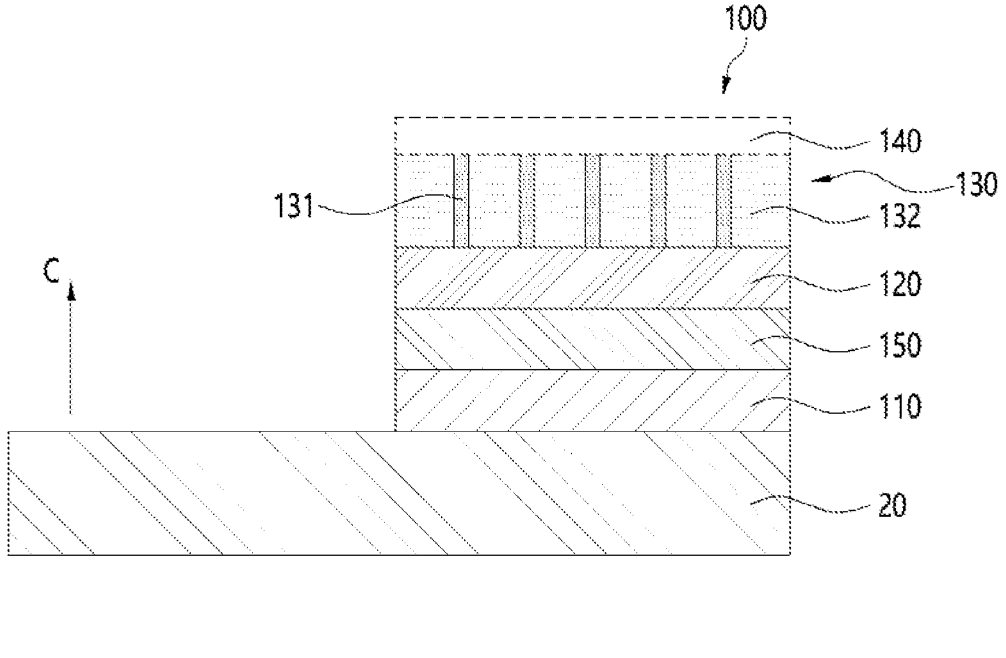
FIG. 2 is a cross-sectional view illustrating the principal constituent elements of a transparent antenna according to an embodiment of the present disclosure.

The transparent antenna 10 may be protected by a heat-resistant cover layer 140 (see FIG. 2). The heat-resistant cover layer 140 will be described later in detail.

Through the structure of the transparent antenna 10, the transparent antenna 10 is located not to be seen from the outside so that the driver's FOV (field of view) is not disturbed at all without damaging the original design of the vehicle. In addition, since the transparent antenna 10 can be attached to and installed on the vehicle glass 20, the transparent antenna 10 has an advantage of being easy to install on the vehicle glass 20.

Figure 3:
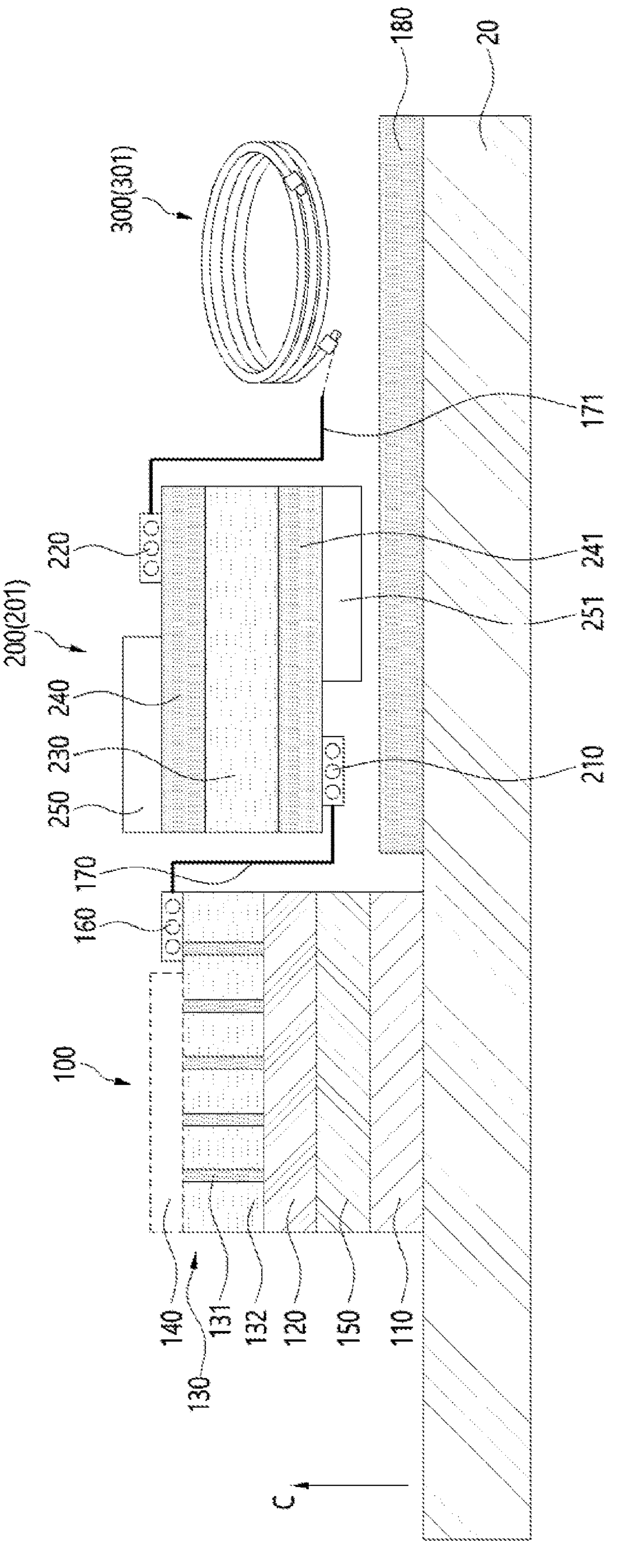
FIG. 3 is a cross-sectional view illustrating a transparent antenna according to an embodiment of the present disclosure.

FIG. 2 is a cross-sectional view illustrating the principal constituent elements of a transparent antenna according to an embodiment of the present disclosure. FIG. 3 is a cross-sectional view illustrating a transparent antenna according to an embodiment of the present disclosure.

Referring to FIG. 2, an antenna portion 100 of the transparent antenna 10 may include an adhesive layer 110 attached to the glass 20, a transparent substrate 120 disposed on the adhesive layer 110, and an antenna structure layer 130 disposed on the transparent substrate 120. A heat-resistant cover layer 140 may be located on the antenna structure layer 130.

In FIG. 2, the direction of the arrow C may represent the inward direction of the vehicle. That is, when the transparent antenna 10 is installed on the vehicle glass 20, the adhesive layer 110 may be attached to the inner surface of the vehicle glass 20 so that the transparent antenna 10 can be installed on the vehicle glass 20.

The adhesive layer 110 may include a silicone-based or acrylic material. For example, the adhesive layer 110 may use an acrylic or silicone-based material having excellent durability against ultraviolet (UV) light.

Figure 4:
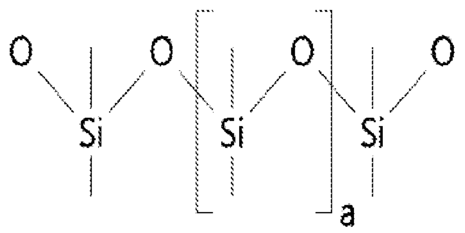
FIG. 4 is a chemical structural formula illustrating a structure of a silicone-based adhesive layer applied to a transparent antenna according to an embodiment of the present disclosure.

FIG. 4 is a chemical structural formula showing a structure of a silicone-based adhesive layer applied to a transparent antenna according to an embodiment of the present disclosure.

Referring to FIG. 4, the silicone-based adhesive means a material including SiOH structure.

A UV blocking film 150 may be disposed on the adhesive layer 110. That is, the UV blocking layer 150 may further be disposed between the adhesive layer 110 and the transparent substrate 20.

The UV blocking function of the UV blocking film 150 means that 99% or more of UV light is blocked in a wavelength band of 330 to 380 nm.

Figure 5:
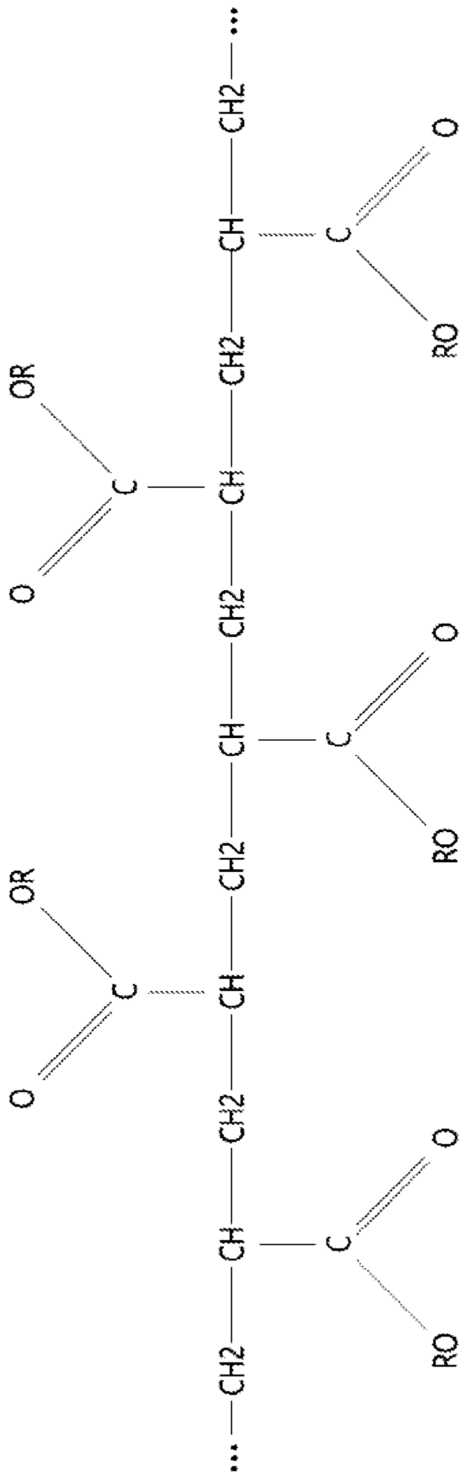
FIG. 5 is a chemical structural formula illustrating a structure of an acrylic adhesive layer applied to a transparent antenna according to an embodiment of the present disclosure.

FIG. 5 is a chemical structural formula showing a structure of an acrylic adhesive layer applied to a transparent antenna according to an embodiment of the present disclosure.

In an exemplary embodiment, the adhesive layer 110 may include an acrylic material.

As shown in FIG. 5, the acrylic material refers to a material containing a combination of COOH and OH. An additive (sunscreen) capable of blocking UV rays may be mixed with the adhesive layer 110. Therefore, the adhesive layer 110 may act as an adhesive layer capable of blocking UV rays.

In an exemplary embodiment, the sunscreen may include at least one of a benzotriazole-based polymer, a triazole-based polymer, or an inorganic material including $SiO_2$ (or $TiO_2$).

UV rays can be prevented from flowing into the transparent antenna 10 through a laminated structure of the adhesive layer 110 having strong UV light durability and the UV blocking film 150. Accordingly, the transparent antenna 10 can prevent the transparent antenna 10 from being damaged or yellowed due to UV rays.

The transparent substrate 120 may include PET or Cyclo Olefin Polymer (COP). The transparent substrate 120 may have heat resistance. For example, the transparent substrate 120 may use at least one of a heat-resistant PET material (dielectric constant of 3.0 to 3.2, dielectric loss of 0.005 to 0.01) and a COP (Cyclo Olefin Polymer) material having excellent characteristics in low dielectric and transparency.

The COP material has a dielectric constant of 2.6 or less and a dielectric loss of 0.001 or less, which is lower than that of PET, so that low signal loss can be expected. The transparent antenna 10, which uses the transparent substrate 120 including the COP material due to high heat resistance (Tg~170° C.), may have high heat resistance.

The transparent substrate 120 may require an appropriate thickness. The transparent substrate 120 may serve as a substrate having a low loss (low dielectric material) at a predetermined thickness (50 mm) or more. However, if the transparent substrate 10 becomes too thick, the flexibility of the transparent substrate 10 is degraded, so that it is not easy for the transparent substrate 10 to be bonded to the vehicle glass 20 having a curvature. In consideration of this situation, according to an embodiment of the present disclosure, the transparent substrate 120 may have a thickness of 50 to 150 μm.

Meanwhile, the heat-resistant cover layer 140 may include PET or Cyclo Olefin Polymer (COP). For example, the heat-resistant cover layer 140 may have the same physical properties as the transparent substrate 120. Therefore, redundant descriptions will herein be omitted for brevity.

The antenna structure layer 130 disposed on the transparent substrate 120 may use a transparent electrode or a metal mesh as an antenna structure.

As the transparent electrode can be used in various ways, such as ITO (Indium Tin Oxide), CNT (Carbon Nanotube), nano-silverwire, metal mesh, etc. According to an embodiment of the present disclosure, a metal mesh having low resistance and relatively low cost may be used to minimize signal loss.

That is, as an exemplary embodiment, the antenna structure layer 130 may have a metal mesh shape. Referring to FIGS. 2 and 3, the antenna structure layer 130 may include a metal mesh structure 131 and a resin layer 132 filling the metal mesh structure 131.

The metal mesh structure 131 may have a mesh structure in which metal lines having a first line width are spaced apart from each other by a first spacing.

The power feeding portions 200 and 201 may be connected between the antenna structure layer 130 and the connection cables 300 and 301.

In an exemplary embodiment, first surfaces of the power feeding portions 200 and 201 may be connected to the antenna structure layer 130, and second surfaces of the power feeding portions 200 and 201 may be connected to the connection cables 300 and 301, respectively.

As described above, the connection portion 160 disposed on the antenna structure layer 130 and the bonding portion 210 disposed on the second surface of the power feeding portions 200 and 201 may be electrically connected by a solder 170 or the like.

In addition, the bonding portion 220 disposed on the first surfaces of the power feeding portions 200 and 201 may be electrically connected to the connection cables 300 and 301 by the solder 171, etc.

The power feeding portions 200 and 201 may include a substrate 230, a first metal layer 240 disposed on the first surface of the substrate 230, and a second metal layer 241 disposed on the second surface of the substrate 230.

The power feeding portions 200 and 201 may be disposed on the black mask layer 180 located on the glass 20.

A first cover layer 250 may be disposed on the first surfaces of the power feeding portions 200 and 201. In addition, a second cover layer 251 may be disposed on the second surfaces of the power feeding portions 200 and 201.

At least one of the first cover layer 250 and the second cover layer 251 may include PET or Cyclo Olefin Polymer (COP). For example, at least one of the first cover layer 250 and the second cover layer 251 may have the same physical properties as the heat-resistant cover layer 140 or the transparent substrate 120. Therefore, redundant descriptions will herein be omitted.

Figure 6:
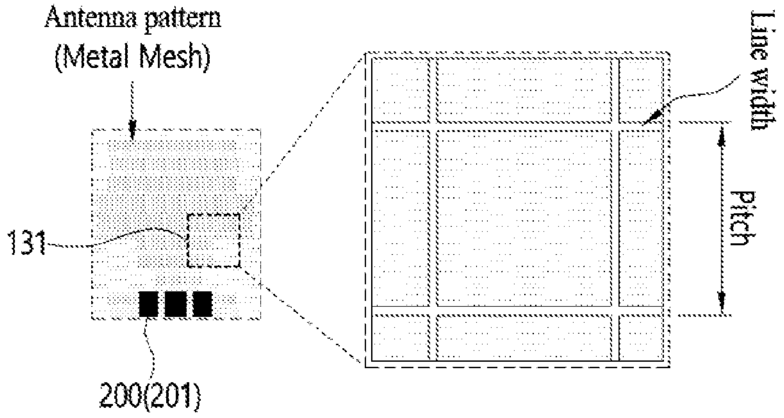
FIG. 6 is a diagram illustrating a metal mesh structure of a transparent antenna according to an embodiment of the present disclosure.

FIG. 6 is a diagram illustrating a metal mesh structure of a transparent antenna according to an embodiment of the present disclosure.

FIG. 6 shows a photograph of the actually manufactured transparent antenna 10. A portion of the metal mesh structure 131 of the transparent antenna 10 is enlarged as shown in the right figure of FIG. 6. The metal mesh structure 131 may be electrically connected to the power feeding portions 200 and 201.

At this time, the thickness of the line constituting the metal mesh structure 131 may be referred to as a line width (critical dimension CD), and a line-to-line distance may be defined as a pitch.

In general, when the line width of the metal mesh structure 131 is increased, resistance of the metal mesh structure 131 decreases and antenna radiation characteristics of the metal mesh structure 131 can be improved. On the other hand, when the line width becomes thicker than a certain thickness, transmittance decreases and the antenna line becomes visible.

Accordingly, the line width of the metal mesh structure 131 may be set in consideration of resistance and transmittance thereof.

Figure 7:
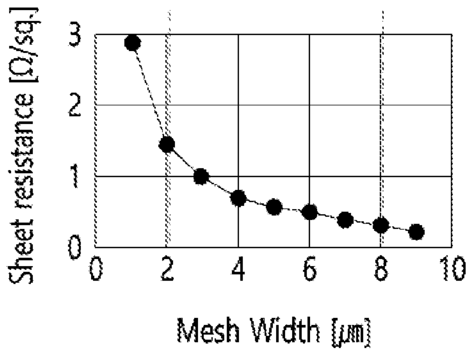
FIG. 7 is a graph illustrating sheet resistance according to a line width (critical dimension CD) of a metal mesh structure.
Figure 8:
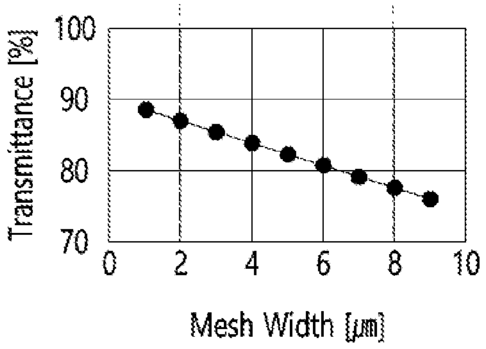
FIG. 8 is a graph illustrating transmittance according to a line width (critical dimension CD) of a metal mesh structure.

FIG. 7 is a graph illustrating sheet resistance according to a line width (critical dimension CD) of the metal mesh structure. FIG. 8 is a graph illustrating transmittance according to a line width (critical dimension CD) of the metal mesh structure.

As described above, referring to FIG. 7, sheet resistance decreases as the line width increases. This means that the antenna radiation performance is improved.

Conversely, referring to FIG. 8, as the line width increases, transmittance decreases. This means that the transparent antenna 10 can be seen in the driver's field of view.

According to an embodiment of the present disclosure, it is advantageous that the line width of the metal mesh structure is 2 to 8 mm in consideration of the antenna radiation characteristics and transmittance.

On the other hand, if the spacing between the metal mesh structures 131 becomes smaller, the resistance decreases and the antenna radiation characteristics are improved. However, when the spacing between the metal mesh structures 131 becomes less than 50 nm, transmittance decreases so that the antenna structure becomes visible as a whole. Considering this situation, it is advantageous that the spacing between the metal mesh structures is 50 to 300 mm.

When the metal mesh structure 131 exists alone, mechanical durability may be deteriorated. Therefore, a resin layer 132 made of resin or OCA (optical clear adhesive) material is positioned next to the metal mesh structure 131 so that the metal mesh structure 131 can be filled with the resin layer 132.

As such, the resin layer 132 can allow the metal mesh structure 131 to be mechanically stabilized. In addition, as described above, the occurrence of scratches on the transparent antenna 10 or damage to the transparent antenna 10 can be minimized by stacking the heat-resistant cover layer 140 on the uppermost layer of the transparent antenna 10.

The transparent antenna 10 having the above structure can be applied as a transparent antenna for vehicles, can minimize signal loss, and can have high heat resistance. In addition, it is possible to implement a transparent antenna 10 capable of preventing yellowing caused by UV rays.

As 5G communication has rapidly come into widespread use, the improvement process for vehicle antennas is underway to expand from the existing FM/AM and LTE (4G) communication antennas to 5G Sub6 and V2X communication that supports high frequencies.

However, as the frequency increases, 5G signals may have high straightness and are likely to lead to signal loss when there are obstacles. In order to minimize signal loss in the 5G band, materials with low dielectric constant and dielectric loss are required (signal loss∝frequency×dielectric constant ½×dielectric loss).

In particular, vehicle antennas have various requirements, such as antenna performance including signal loss, network scalability that can support future high-speed communication, design flexibility that does not damage the vehicle's unique design, ease of installation that can be installed in actual vehicles, and the like.

Accordingly, vehicle antennas are being developed in various ways, such as shark fin antennas, dashboard-embedded types, spoiler-embedded types, and side-mirror types, in consideration of performance, design, and network scalability.

The shark fin antennas, which are most widely applied as vehicle antennas, have high transmission/reception (Tx/Rx) performance by being installed on the roof of vehicles, but have limitations in network scalability due to space restrictions.

In contrast, the dashboard-embedded antenna is installed inside the vehicle and has poor antenna performance, but has an advantage of increasing network scalability due to relatively small spatial restrictions.

In order to supplement these existing antennas, the spoiler-embedded antenna and the sidemirror-embedded antenna have recently been developed and applied to vehicles to further increase the antenna performance and the network scalability, but such embedded-type antennas have difficulty in actual implementation in vehicles due to their design constraints.

The transparent antenna for vehicle glass proposed in the present disclosure can be used as an antenna for FM/AM and LTE (4G) communication, and can be extended to 5G Sub6 and V2X communication supporting high frequencies.

In addition, the transparent antenna according to the embodiment of the present disclosure can be used as a future antenna with network expandability without damaging the design of the vehicle.

In addition, the transparent antenna according to the embodiment of the present disclosure has no design limitation, and thus can be applied to any vehicle.

In addition, the transparent antenna according to the embodiment of the present disclosure can freely design and control the size and structure of the antenna and can be extended to 5G and V2X communication antennas.

Hereinafter, antenna performance measured in the 5G sub6 band (<6 GHz) by bonding a transparent antenna having the above-described structure to glass will be described in detail.

Figure 9:
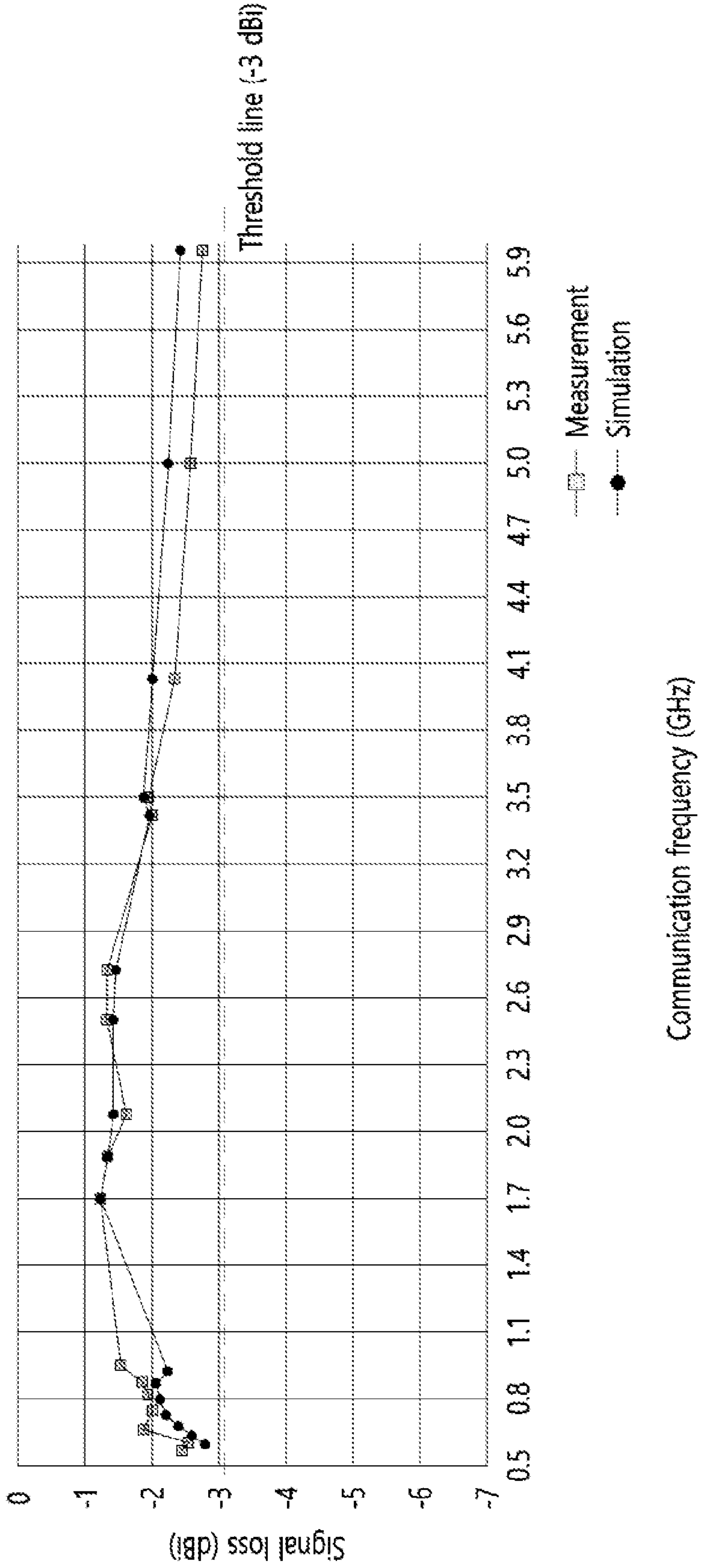
FIG. 9 is a graph illustrating signal loss for each frequency of a transparent antenna according to an embodiment of the present disclosure.

FIG. 9 is a graph illustrating signal loss for each frequency of the transparent antenna according to an embodiment of the present disclosure.

Referring to FIG. 9, signal loss of the transparent antenna 10 for each communication frequency is shown. In FIG. 9, square dots may represent actual measurement results, and circular dots may represent simulation results.

As shown in FIG. 9, it can be confirmed that the actual measurement and simulation results are almost similar to each other. This means that the antenna structure can be predicted to some extent through simulation. Considering that a threshold line (reference line) of signal loss of the communication device is generally considered to be −3 dBi, FIG. 9 is a graph illustrating the result of the transparent antenna 10 showing a relatively small signal loss in actual measurement or simulation. This means that the transparent antenna 10 for vehicles according to an embodiment of the present disclosure can be actually used.

Figure 10:
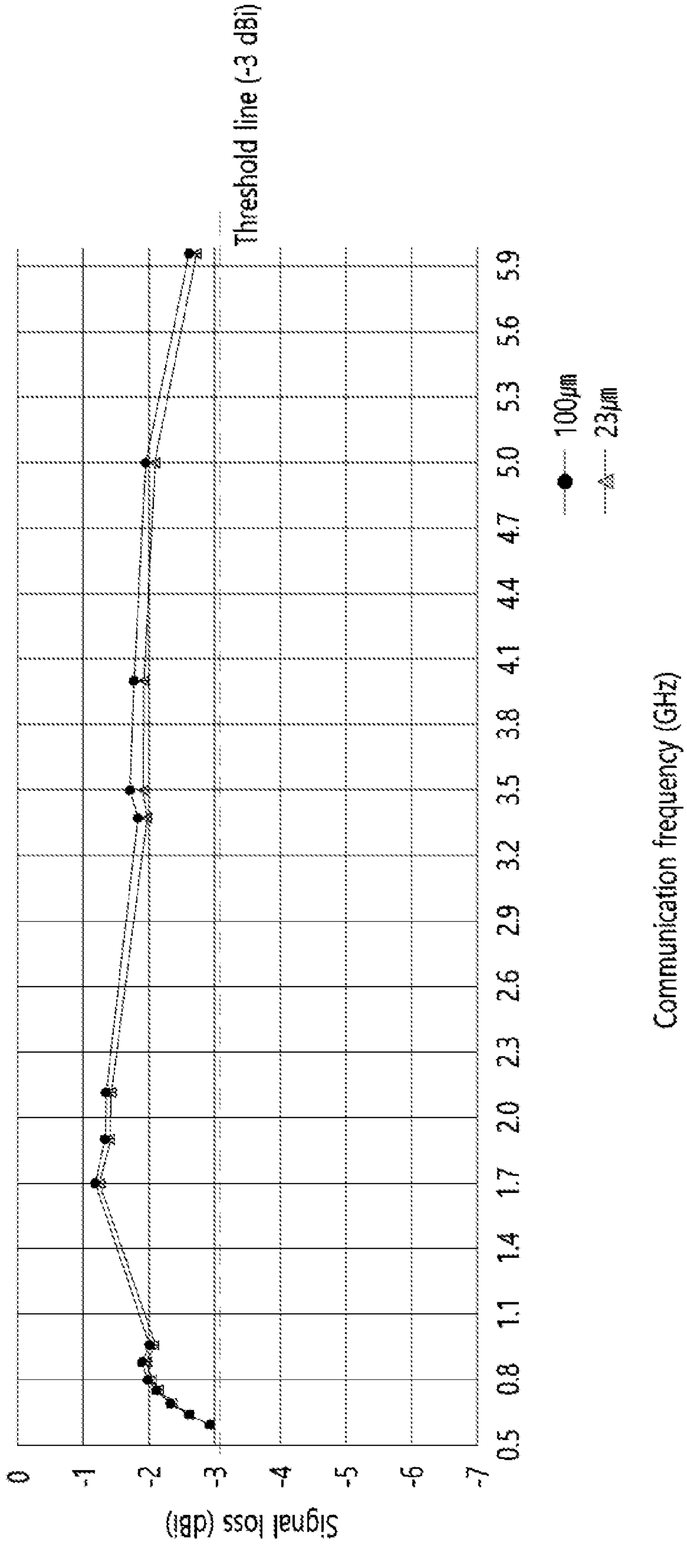
FIG. 10 is a graph illustrating signal loss for each cover layer thickness of a transparent antenna according to an embodiment of the present disclosure.

FIG. 10 is a graph illustrating signal loss for each cover layer thickness of a transparent antenna according to an embodiment of the present disclosure.

As described above, according to an embodiment of the present disclosure, the heat-resistant cover layer 140 may be formed of heat-resistant PET or COP.

The cover layer 140 may serve as a protective layer at a certain thickness 20 μm or more. However, if the cover layer 140 becomes too thick, signal loss may easily occur in the cover layer 140.

According to an embodiment of the present disclosure, the thickness range of the cover layer 140 may be 20 to 100 μm in consideration of these matters.

FIG. 10 shows simulation values of signal loss in the 5G Sub6 band of the transparent antenna 10 for each thickness of the heat-resistant cover layer 140. That is, referring to FIG. 10, simulation values of signal loss when the thickness of the heat resistant cover layer 140 is 100 μm and when the thickness is 23 μm are shown.

In the range proposed by the present disclosure, it can be confirmed that the signal loss per frequency is not a problem within the acceptance criteria (−3 dBi).

Figure 11:
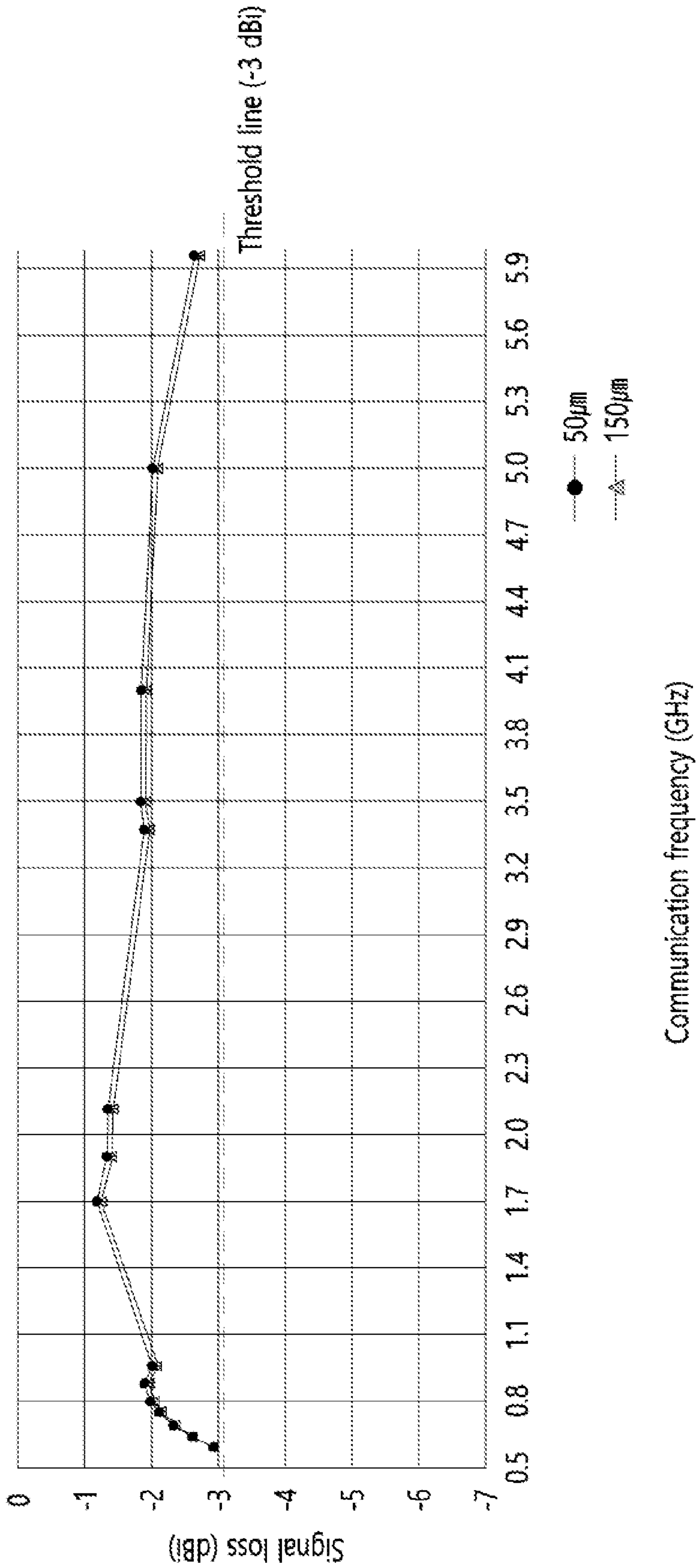
FIG. 11 is a graph illustrating signal loss for each transparent substrate thickness of the transparent antenna according to an embodiment of the present disclosure.

FIG. 11 is a graph showing signal loss for each thickness of a transparent substrate of the transparent antenna according to an embodiment of the present disclosure.

As described above, according to an embodiment of the present disclosure, the heat-resistant transparent substrate 120 may be formed of heat-resistant PET or COP.

The transparent substrate 120 may serve as a low-loss substrate at a certain thickness (50 μm) or more. However, if the transparent substrate 10 becomes too thick, the flexibility of the transparent substrate 10 is degraded, so that it is not easy for the transparent substrate 10 to be bonded to the vehicle glass 20 having a curvature.

According to an embodiment of the present disclosure, the thickness range of the transparent substrate 120 may be 50 to 150 μm in consideration of these matters.

FIG. 11 shows simulation values of signal loss in the 5G Sub6 band of the transparent antenna 10 for each thickness of the transparent substrate 120. That is, referring to FIG. 11, simulation values of signal loss when the thickness of the transparent substrate 120 is 50 μm and when the thickness is 150 μm are shown.

In the range proposed by the present disclosure, it can be confirmed that the signal loss per frequency is not a problem within the acceptance criteria (−3 dBi).

Figure 12:
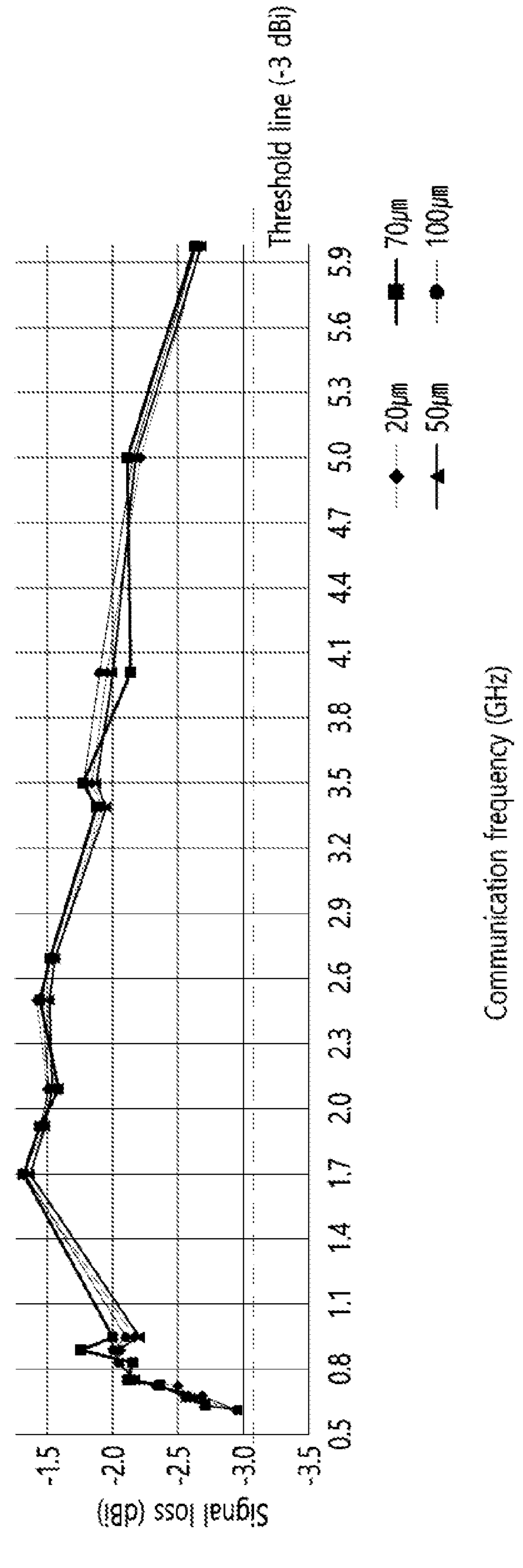
FIG. 12 is a graph illustrating signal loss for each thickness of an ultraviolet (UV) blocking film of a transparent antenna according to an embodiment of the present disclosure.

FIG. 12 is a graph illustrating signal loss for each thickness of the UV blocking film of the transparent antenna according to an embodiment of the present disclosure.

The UV blocking film 150 and the adhesive layer 110 require a certain thickness (20 μm) or more to perform the role of UV blocking and adhesion. However, when the UV blocking film 150 and the adhesive layer 110 becomes too thick, an adhesive hardening phenomenon may occur to result in cracks.

According to an embodiment of the present disclosure, the thickness range of at least one of the UV blocking film 150 and the adhesive layer 110 may be 20 to 100 μm in consideration of these matters.

FIG. 12 shows simulation values of signal loss in the 5G Sub6 band of the transparent antenna 10 for each thickness of the transparent substrate 120. That is, referring to FIG. 12, simulation values of signal loss when the thickness of the UV blocking film 150 and the adhesive layer 110 is 20 μm, when the thickness of the UV blocking film 150 and the adhesive layer 110 is 50 μm, when the thickness of the UV blocking film 150 and the adhesive layer 110 is 70 μm, and when the thickness is 100 μm are shown.

In the range proposed by the present disclosure, it can be confirmed that the signal loss per frequency is not a problem within the acceptance criteria (−3 dBi).

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe, and the scope of the technical idea of the present disclosure is not limited by such embodiments.

The scope of protection of the present disclosure should be interpreted by the claims below, and all technical ideas within the scope equivalent thereto should be construed as being included in the scope of the present disclosure.

According to the present disclosure, it is possible to provide a transparent antenna for vehicles applicable to 5G communication and V2X communication.

As is apparent from the above description, the transparent antenna according to the embodiments of the present disclosure has the following effects.

According to the embodiments of the present disclosure, a transparent antenna for vehicles, which can be applied to 5G communication and V2X communication, can be provided.

The transparent antenna according to the embodiments of the present disclosure can implement low signal loss, high heat resistance, and yellowing prevention, which are suitable for the automotive environments.

In addition, the transparent antenna according to the embodiment of the present disclosure can be freely installed in any vehicle design without damaging the original design of vehicles.

Furthermore, according to another embodiment of the present disclosure, there are additional technical effects not mentioned herein. Those skilled in the art will appreciate such technical effects through the whole of the specification and drawings.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A transparent antenna comprising:

an adhesive layer configured to be attached to glass of a vehicle;

a transparent substrate disposed on the adhesive layer;

an antenna structure layer disposed on the transparent substrate and having a metal mesh structure;

a protective layer disposed on the antenna structure layer; and a power feeding portion connected to the antenna structure layer, wherein the power feeding portion comprises:

a substrate;

a first metal layer disposed on a first surface of the substrate;

a first bonding portion disposed on the first metal layer, and electrically connected to a cable;

a second metal layer disposed on a second surface of the substrate;

a second bonding portion disposed on the second metal layer, and electrically connected to a connection portion disposed on the antenna structure layer; and a first cover layer disposed on an area of the first metal layer in which the first bonding part is not disposed and a second cover layer disposed on an area of the second metal layer in which the second bonding part is not disposed, wherein at least one of the cover layer or the transparent substrate includes cyclo olefin imide polymer (COP).

2. The transparent antenna according to claim 1, wherein the antenna structure layer further includes:

a resin formed to fill the metal mesh structure.

3. The transparent antenna according to claim 1, wherein, the power feeding portion is configured to be disposed on a black mask layer of the glass.

4. The transparent antenna according to claim 1, further comprising:

an ultraviolet (UV) blocking film disposed between the adhesive layer and the transparent substrate.

* * * * *